United States Patent
Paulus, Jr. et al.

(10) Patent No.: US 11,488,365 B2
(45) Date of Patent: Nov. 1, 2022

(54) NON-UNIFORM STEREO RENDERING

(71) Applicant: Magic Leap, Inc., Plantation, FL (US)

(72) Inventors: John Carl Paulus, Jr., Davie, FL (US); Michael Harold Liebenow, Loxahatchee, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/079,182

(22) Filed: Oct. 23, 2020

(65) Prior Publication Data

US 2021/0125412 A1    Apr. 29, 2021

Related U.S. Application Data

(60) Provisional application No. 62/926,306, filed on Oct. 25, 2019.

(51) Int. Cl.
| | | |
|---|---|---|
| *G06T 19/00* | (2011.01) | |
| *G06T 7/70* | (2017.01) | |
| *G02B 27/01* | (2006.01) | |
| *H04N 13/344* | (2018.01) | |

(52) U.S. Cl.
CPC ........ *G06T 19/006* (2013.01); *G02B 27/0172* (2013.01); *G06T 7/70* (2017.01); *H04N 13/344* (2018.05); *G02B 2027/0134* (2013.01); *G02B 2027/0138* (2013.01); *G02B 2027/0178* (2013.01); *G06T 2207/10012* (2013.01); *G06T 2207/20212* (2013.01); *G06T 2210/22* (2013.01)

(58) Field of Classification Search
None
See application file for complete search history.

(56) References Cited

U.S. PATENT DOCUMENTS

| | | | |
|---|---|---|---|
| 2001/0048447 A1 | 12/2001 | Jogo | |
| 2006/0188173 A1* | 8/2006 | Zhang | H04N 7/0122 382/276 |
| 2010/0188416 A1* | 7/2010 | Hayes | G06T 15/503 345/592 |
| 2013/0202274 A1 | 8/2013 | Chan | |
| 2016/0011419 A1 | 1/2016 | Gao | |
| 2016/0033770 A1* | 2/2016 | Fujimaki | H04N 13/344 345/8 |

(Continued)

OTHER PUBLICATIONS

International Search Report and Written Opinion dated Jan. 27, 2021, for PCT Application No. PCT/US/2020/057212, filed Oct. 23, 2020, seventeen pages.

(Continued)

*Primary Examiner* — Frank S Chen
(74) *Attorney, Agent, or Firm* — Morrison & Foerster LLP

(57) ABSTRACT

Examples of the disclosure describe systems and methods for recording augmented reality and mixed reality experiences. In an example method, an image of a real environment is received via a camera of a wearable head device. A pose of the wearable head device is estimated, and a first image of a virtual environment is generated based on the pose. A second image of the virtual environment is generated based on the pose, wherein the second image of the virtual environment comprises a larger field of view than a field of view of the first image of the virtual environment. A combined image is generated based on the second image of the virtual environment and the image of the real environment.

20 Claims, 13 Drawing Sheets

(56) References Cited

U.S. PATENT DOCUMENTS

| | | | |
|---|---|---|---|
| 2017/0205903 A1 | 7/2017 | Miller et al. | |
| 2017/0206691 A1* | 7/2017 | Harrises | |
| 2018/0356884 A1* | 12/2018 | Lee | H04S 3/008 |
| 2019/0102944 A1* | 4/2019 | Han | G06T 15/20 |
| 2019/0122439 A1* | 4/2019 | Thiebaud | G06F 3/1423 |
| 2019/0235729 A1 | 8/2019 | Day | |
| 2020/0105015 A1* | 4/2020 | Ben Himane | G06T 7/251 |
| 2020/0201022 A1* | 6/2020 | Shameli | A61B 1/05 |
| 2021/0014475 A1* | 1/2021 | Lee | H04N 13/239 |
| 2021/0042979 A1* | 2/2021 | Ballagas | G02B 27/0093 |

OTHER PUBLICATIONS

International Preliminary Report on Patentability and Written Opinion dated May 5, 2022, for PCT Application No. PCT/US2020/057212, filed Oct. 23, 2020, twelve pages.

\* cited by examiner

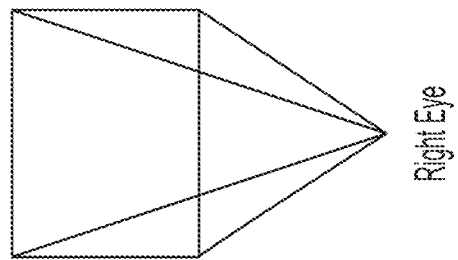
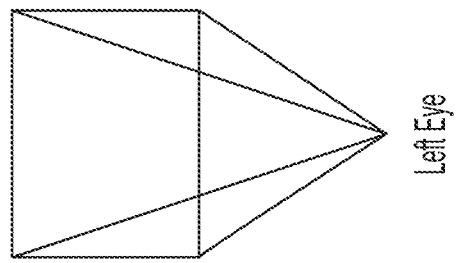
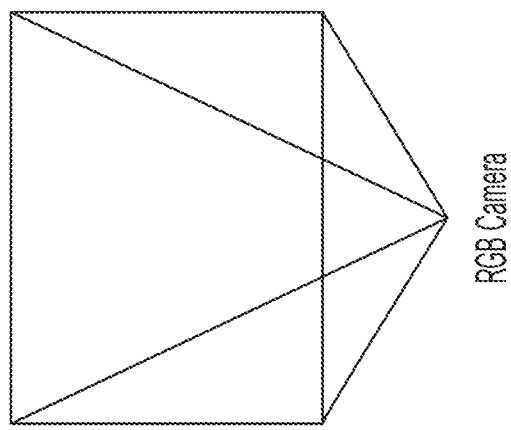
FIG. 6

NON-UNIFORM STEREO RENDERING

CROSS REFERENCE TO RELATED APPLICATIONS

This application claims the benefit of U.S. Provisional Application No. 62/926,306, filed on Oct. 25, 2019, the entire disclosure of which is herein incorporated by reference for all purposes.

FIELD

This disclosure relates in general to systems and methods for rendering and displaying visual information, and in particular to systems and methods for rendering and displaying visual information in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

It can be desirable to capture and record a MR experience so that the MR experience can be shared with other users. MR systems (particularly wearable head devices) can be better positioned than simple video recording systems to record an environment (both real and virtual) in the same way a user experiences the environment. Providing a first-hand view into a user's experience in a real and virtual environment can make the recording feel more immersive, as if a viewer was with the original user at the time of recording. Recording a MR experience can include combining a recording of a real environment with a recording of a virtual environment. Recorded MR content can be useful for both casual content sharing and professional content creation. For example, it may be desirable to share a casual MR experience (e.g., a concert) with other users who may view the recorded MR content on a two-dimensional screen or on a MR system. It may also be desirable for professional content creators to record MR content (e.g., an advertisement) for display on other MR systems or on two-dimensional screens. However, recording a MR experience may not be as trivial as recording simple two-dimensional video at least because a camera used to record a real environment may be positioned offset from a user's eyes so as to not obstruct the user's vision. However, virtual content rendered for the user may be rendered from a perspective of the user's eyes. This offset may create a difference in perspective between what the camera captures and virtual content rendered for a user when combining the two recording streams. Furthermore, a camera may record at different resolutions and/or aspect ratios than displayed virtual content. Combining a recording of a real environment with a recording of a virtual environment may therefore result in poor integration between real content and virtual content (e.g., real content and virtual content may be presented from different perspectives). It can therefore be desirable to create an accurate MR recording system that simulates a first-person experience and displays recorded MR content in an integrated and accurate manner.

BRIEF SUMMARY

Examples of the disclosure describe systems and methods for recording augmented reality and mixed reality experiences. In an example method, an image of a real environment is received via a camera of a wearable head device. A pose of the wearable head device is estimated, and a first image of a virtual environment is generated based on the pose. A second image of the virtual environment is generated based on the pose, wherein the second image of the virtual environment comprises a larger field of view than a field of view of the first image of the virtual environment. A combined image is generated based on the second image of the virtual environment and the image of the real environment.

BRIEF DESCRIPTION OF THE DRAWINGS

FIG. 6 illustrates an example of mixed reality recording, according to one or more embodiments of the disclosure.

DETAILED DESCRIPTION

Figure 1A:
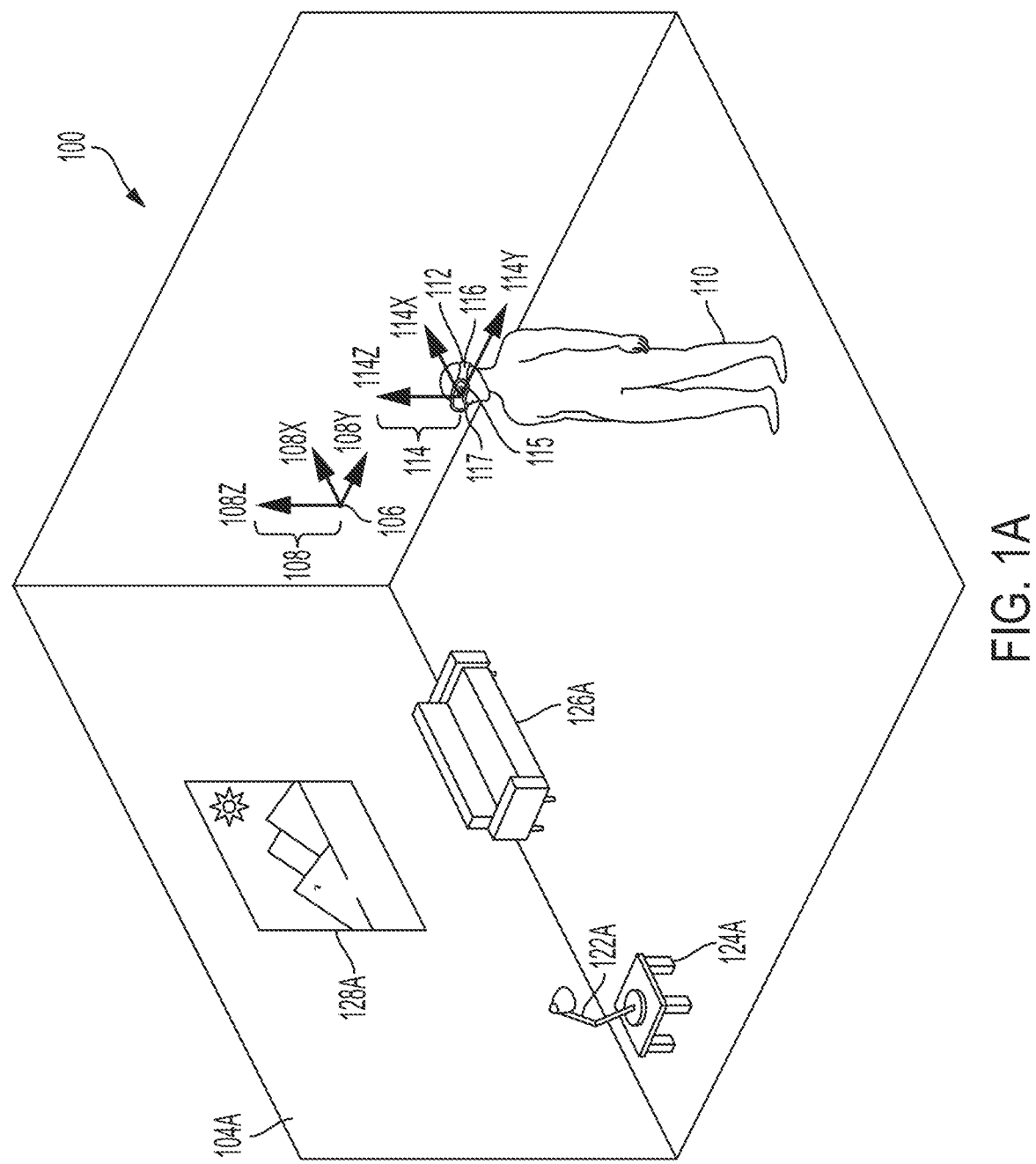
FIGS. 1A-1C illustrate an example mixed reality environment, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can include latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE includes a real lamp post (a real object) at a location coordinate, the virtual environment of the MRE may include a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may include a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may include a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may include a display (e.g., a transmissive display) and one or more speakers, and one or more sensors (e.g., a camera), for example as described below. The real environment 100 shown includes a rectangular room 104A, in which user 110 is standing; and real objects 122A (a lamp), 124A (a table), 126A (a sofa), and 128A (a painting). Room 104A further includes a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
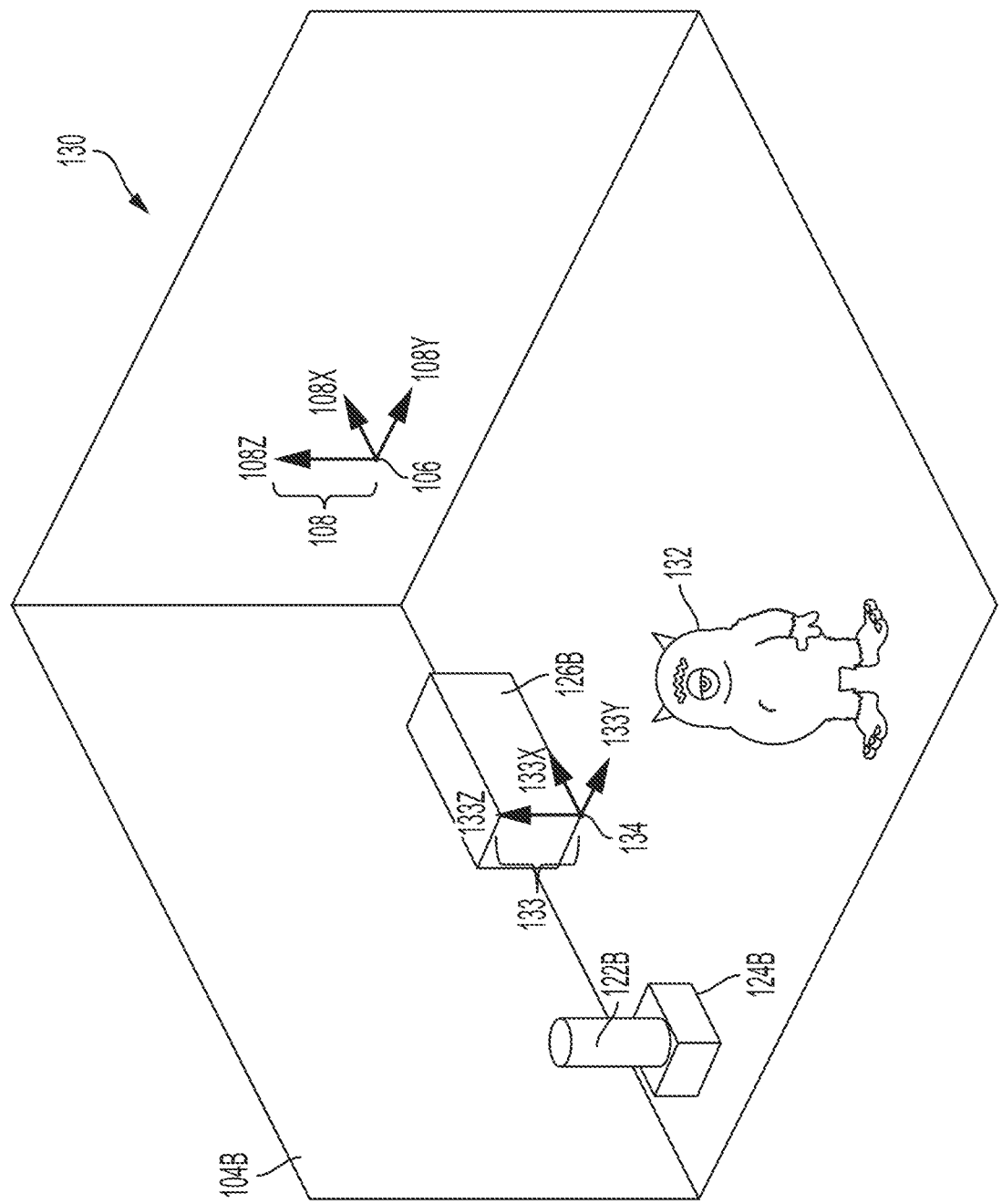

FIG. 1B illustrates an example virtual environment 130 that corresponds to real environment 100. The virtual environment 130 shown includes a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally includes a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
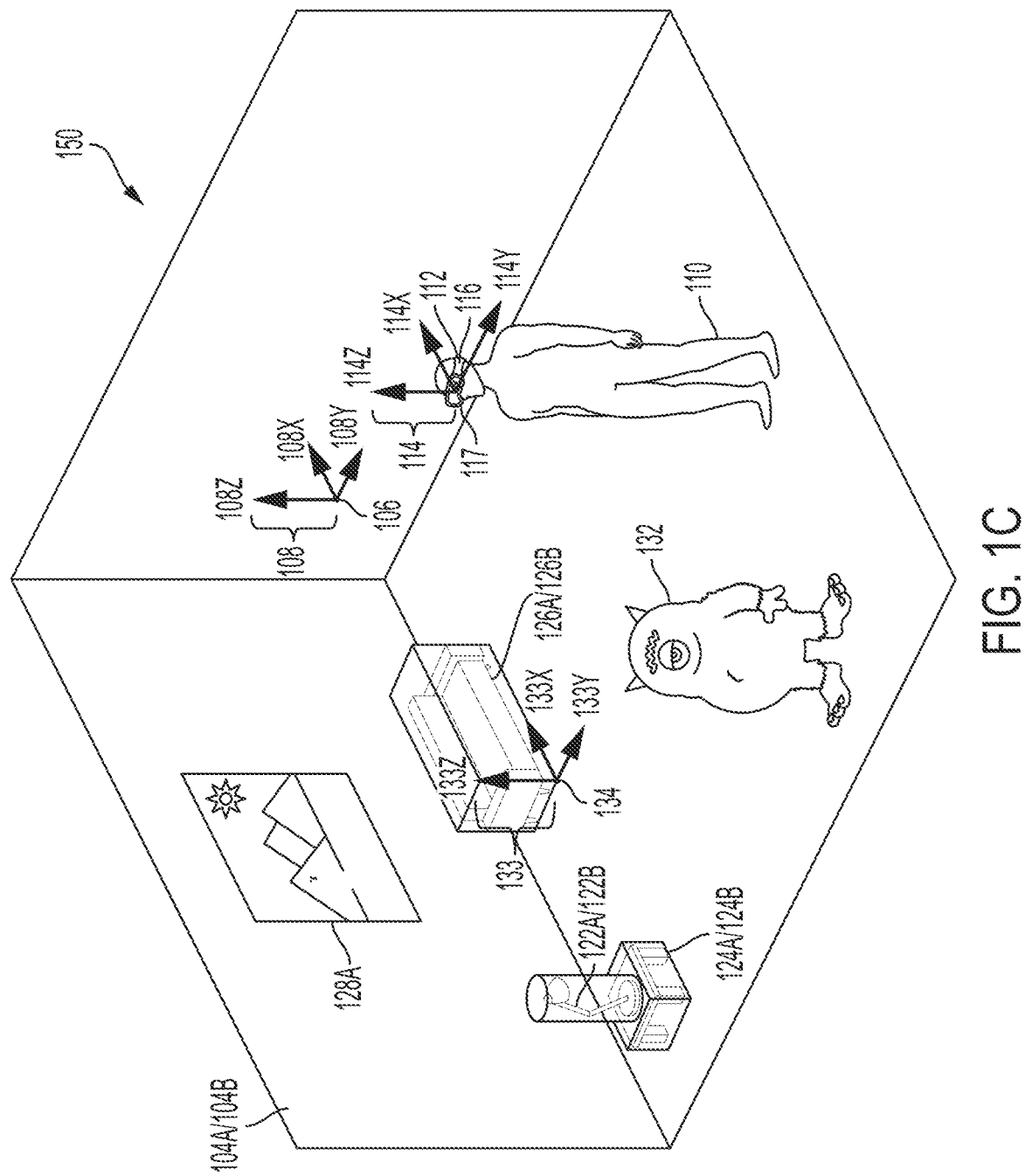

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects include corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may include left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
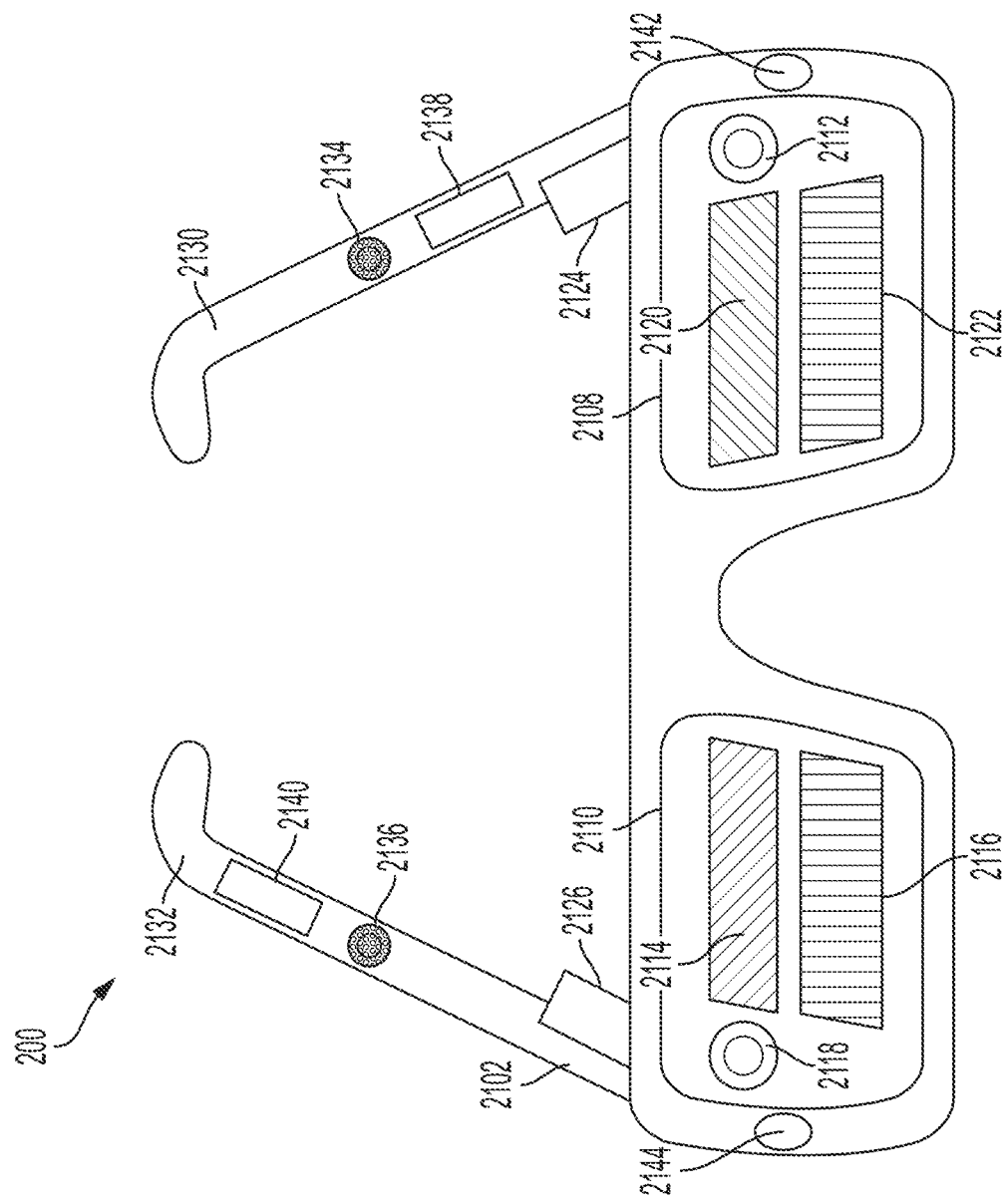
FIGS. 2A-2D illustrate components of an example mixed reality system that can be used to generate and interact with a mixed reality environment, according to one or more embodiments of the disclosure.
Figure 2B:
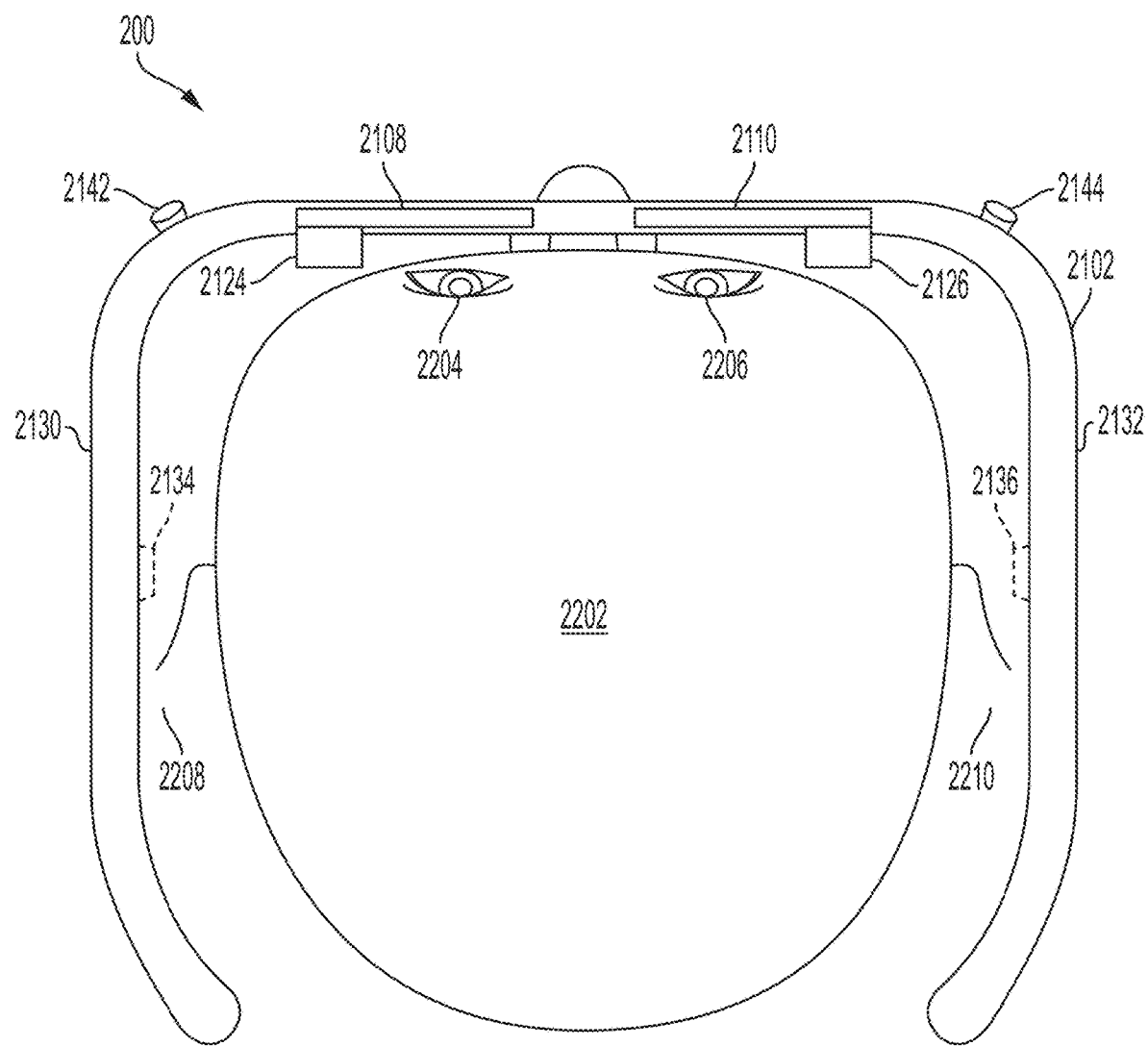
Figure 2C:
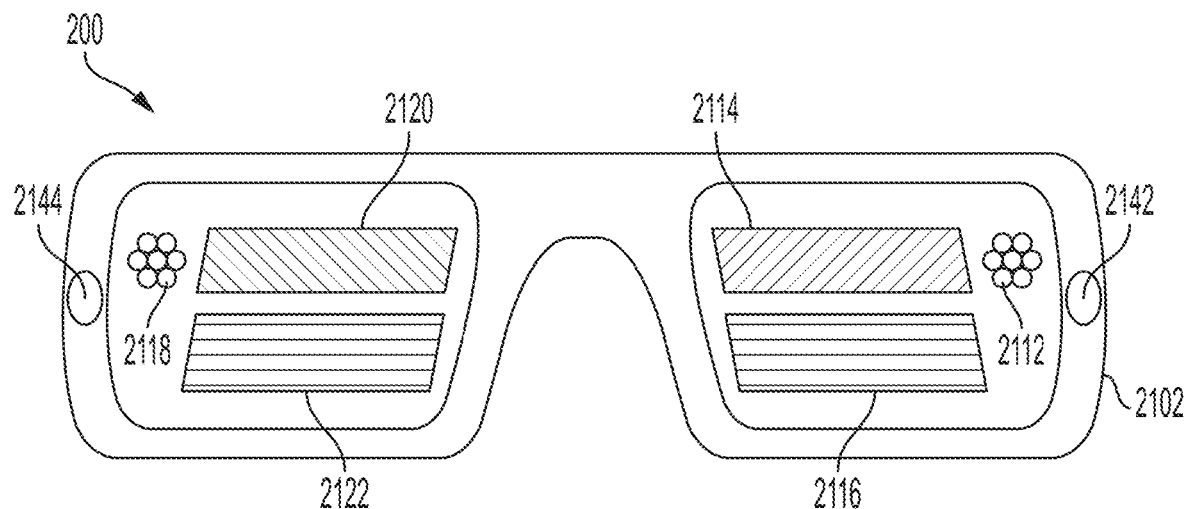
Figure 2D:
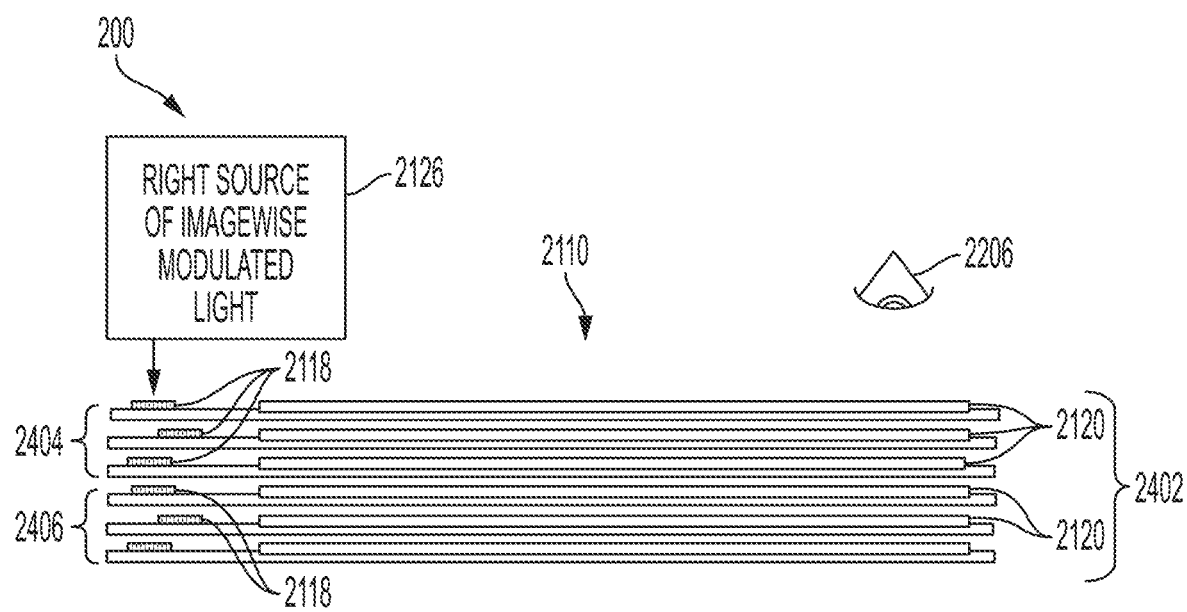

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (µLED) or micro Organic Light Emitting Diode (µOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
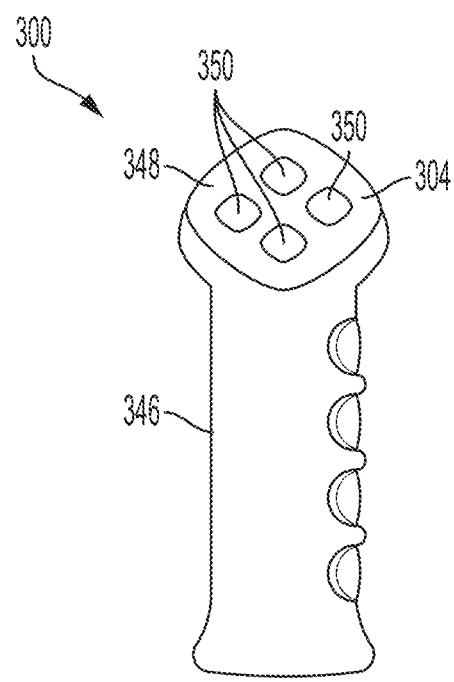
FIG. 3A illustrates an example mixed reality handheld controller that can be used to provide input to a mixed reality environment, according to one or more embodiments of the disclosure.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
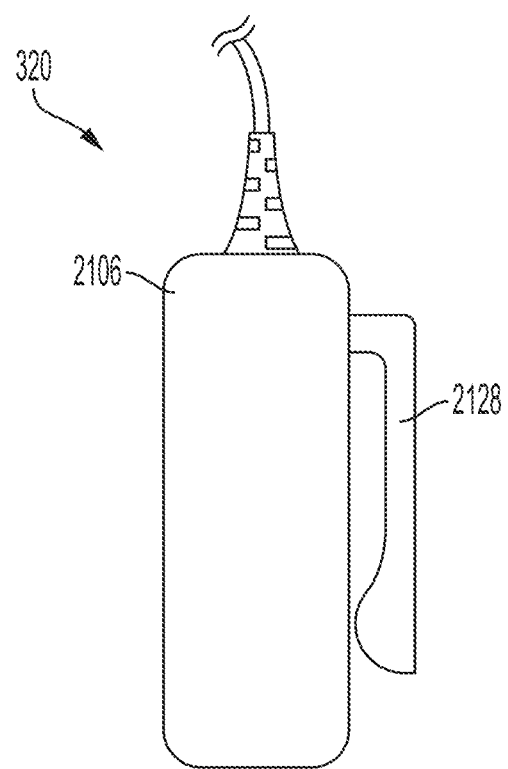
FIG. 3B illustrates an example auxiliary unit that can be used with an example mixed reality system, according to one or more embodiments of the disclosure.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
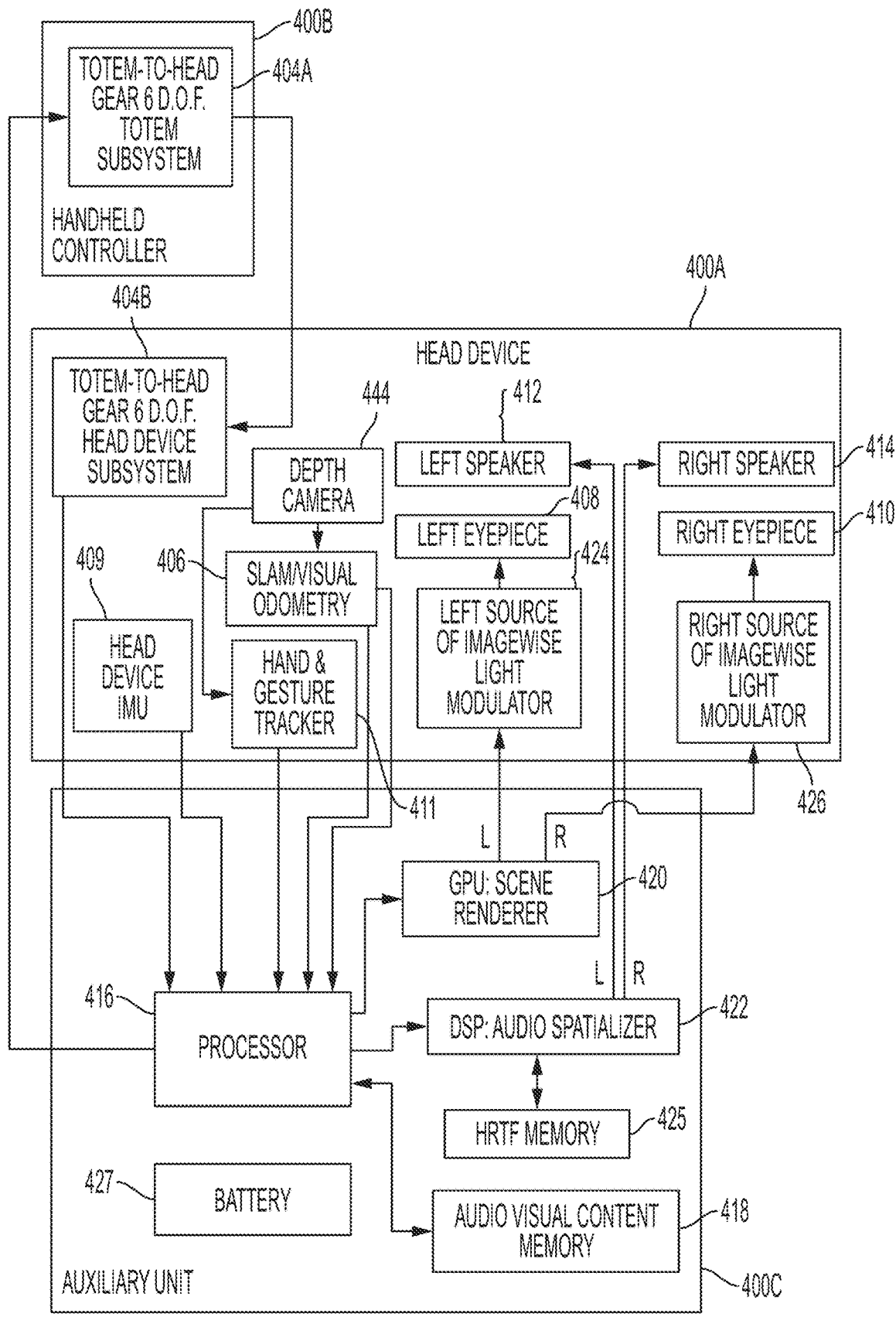
FIG. 4 illustrates an example functional block diagram for an example mixed reality system, according to one or more embodiments of the disclosure.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Mixed Reality Video Capture

Capturing and recording an AR/MR experience may be more complex than capturing a two-dimensional video and may present novel problems. For example, a two-dimensional video recording system may only capture one stream of information (e.g., what an optical/image sensor on the video recording system can capture). An AR/MR experience, on the other hand, may have two or more streams of information. For example, one stream of information may be two-dimensional video and another stream of information may be rendered virtual content. Sometimes three or more streams of information may be used (e.g., when stereo video is captured from two two-dimensional videos, along with accompanying virtual content). Combining multiple streams of information into an accurate AR/MR recording can include accounting for differences in perspective between the multiple streams. It can further be beneficial to handle the combining process in a computationally efficient manner, particularly for portable AR/MR systems that may have limited battery power and/or processing power.

Users may both have cause to capture and record AR/MR content. In some embodiments, users may wish to record and share personal AR/MR content to social media (e.g., an AR/MR recording of a children's play). In some embodiments, users may wish to record and share commercial AR/MR content (e.g., an advertisement). Recorded AR/MR content may be shared to both two-dimensional screens (e.g., by combining one stream of virtual content with one stream of real content) and other MR systems (e.g., by combining two streams of virtual content with two streams of real content). While an original user of an AR/MR system may experience a real environment through transmissive optics (e.g., through a partially transmissive lens), viewers who view recorded AR/MR content may not be in the same real environment. To present a complete AR/MR recording to a viewer can therefore include a video capture of the real environment such that virtual content can be overlaid on the video capture of the real environment.

Capturing a MRE in a video recording can present additional challenges on top of displaying a MRE. For example, mixed reality video capture can include two recording streams: a real environment recording stream and a virtual environment recording stream. A real environment recording stream can be captured using one or more optical sensors (e.g., a camera). It can be advantageous to mount the one or more optical sensors on an AR/MR system (e.g., MR system 112, 200). In embodiments where the AR/MR system is a wearable head device, the one or more optical sensors can be mounted on the wearable head device in close proximity to a user's eyes, and optionally facing in the same direction as the user's eyes. In the described mounting system, the one or more optical sensors can be positioned to capture a video recording of a real environment in close approximation to a way the user experiences the real environment.

A virtual environment recording stream can be captured by recording virtual content being displayed to a user. In some embodiments, an AR/MR system (e.g., MR system 112, 200) can simultaneously display two streams of virtual content to a user (e.g., one stream for each eye) to provide a stereoscopic view to the user. Each virtual rendering can be rendered from a slightly different perspective (which can correspond to the difference in perspective between a user's left and right eyes), and the difference in perspective can make the virtual content appear three-dimensional. A virtual environment recording stream can include one or both virtual renderings displayed to a user's eyes. In some embodiments, a virtual rendering can be overlaid with a real environment recording stream to simulate a MRE that a user experiences when using an AR/MR system. It can be beneficial to use a virtual rendering rendered for a user's eye that is physically closest in location to the one or more optical sensors used for the real environment recording stream. The physical proximity of the user's eye (and the virtual rendering rendered for that corresponding perspective) to the optical sensor can make the combination process more accurate because of the minimal shift in perspective.

One problem that can arise from combining a real environment recording stream and a virtual environment recording stream is that the two recording streams may not have the same resolution and/or aspect ratio. For example, a real environment recording stream may capture video at a resolution of 1920×1080 pixels, but the virtual environment recording stream may only render virtual content at a resolution of 1280×720 pixels. Another problem that can arise is that the real environment recording stream may not have the same field of view as the virtual environment recording stream. For example, a camera may capture the real environment recording stream using a larger field of view than the virtual environment recording stream is rendered at. Accordingly, more information (e.g., a larger field of view) may be captured in the real environment recording stream than in the virtual environment recording stream. In some embodiments, real content that lies outside a field of view of a virtual content's field of view may not have corresponding rendered virtual content in the virtual rendering. When the real environment recording stream is merged with the virtual environment recording stream, an artificial "border" may be present in the combined video, outside of which virtual content is not displayed, but real content is still recorded and displayed. This border can be jarring to viewers because it can distract from the integration of virtual content with real content. It can further present inaccuracies to the viewer. For example, a real object recorded by a camera may have corresponding virtual content (e.g., an information overlay). However, if the real object is outside the virtual rendering's field of view but still within the field of view of a camera, the corresponding virtual content may not be displayed to a viewer until the real object moves within the artificial border. This behavior may be confusing to a viewer of an AR/MR recording because the real object's corresponding virtual content may or may not be visible depending on where the real object exists in relation to the border.

Figure 5A:
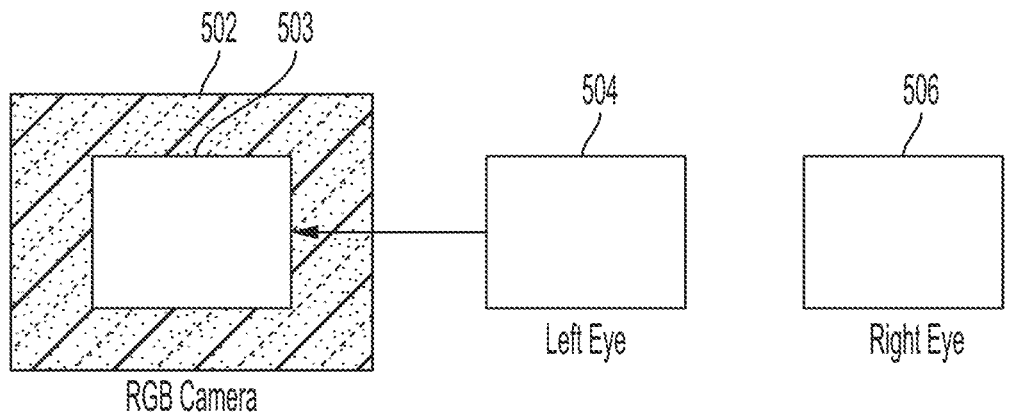
FIGS. 5A-5B illustrate examples of mixed reality recording, according to one or more embodiments of the disclosure.

FIG. 5A illustrates an example embodiment that can mitigate and/or eliminate a border between virtual content and real content. The example embodiment shown can be implemented using one or more components of a mixed reality system, such as one or more of wearable head device 2102, handheld controller 300, and auxiliary unit 320 of the example mixed reality system 200 described above. In the depicted embodiment, a RGB camera can be located near a user's left eye. The RGB camera can record a view 502, which can overlap with and/or include a view 504 of virtual renderings (and/or view 506) presented to a user's left eye. View 502 may be larger than view 504, so combining (e.g., overlaying or superimposing) view 504 on view 502 may result in an artificial border 503. In this embodiment, the AR/MR recording may display real content within the entirety of view 502, but virtual content may only be shown within border 503. Border 503 can be jarring to viewers because virtual content may exist outside border 503 (at least within view 502), but the virtual content may not be displayed until the virtual content moves within border 503. One solution to mitigate and/or eliminate border 503 is to crop view 502 to the size and location of border 503. The cropped view can yield virtual content that is sized in the same way as real content, creating an integrated and immersive viewing experience. However, the cropped view can reduce the viewable area for a viewer by "discarding" information captured by the RGB camera.

Figure 5B:
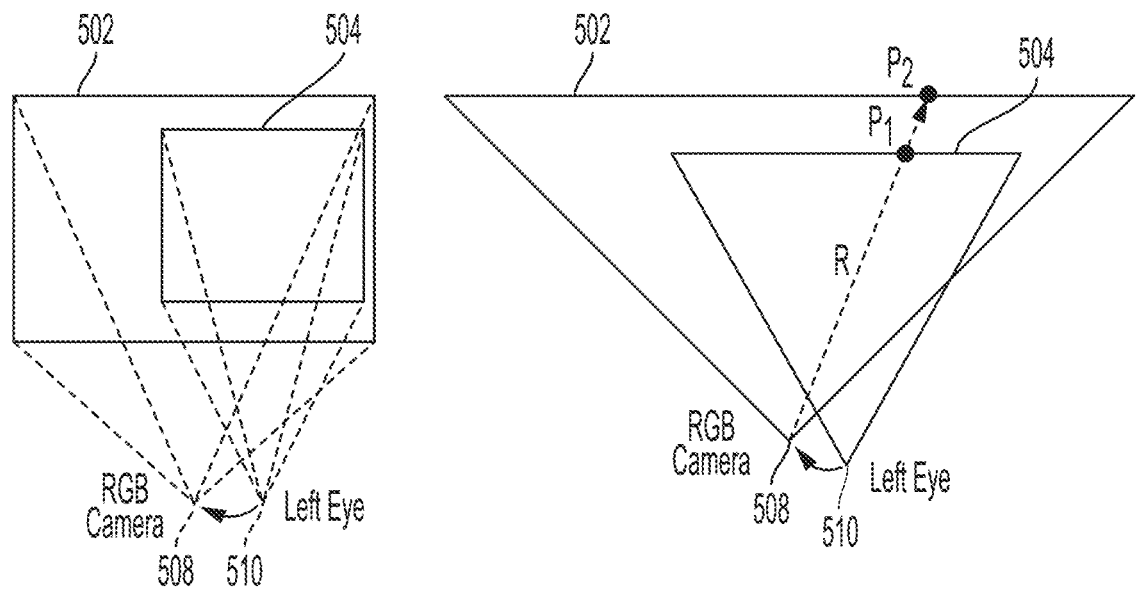

FIG. 5B illustrates an example embodiment for merging perspectives from view 502 and view 504. The example embodiment shown can be implemented using one or more components of a mixed reality system, such as one or more of wearable head device 2102, handheld controller 300, and auxiliary unit 320 of the example mixed reality system 200 described above. Because the RGB camera may have a focal point 508 that is offset from focal point 510 (which can correspond to a center of the user's left eye), view 502 may present a different perspective than view 504, resulting in virtual content that may not be "synchronized" (e.g., lined up and/or aligned) with real content. This can be problematic because virtual content may not properly correspond to real content (e.g., if a face of a virtual object is visible from the perspective of a user's eye, but should not be visible from the perspective of the RGB camera), which can break the immersion of the AR/MR recording. One solution can be to use planar projection to "map" view 504 to view 502. In a planar projection, one or more points $P_1$ in view 504 can be mapped on a line between focal point 508 and the corresponding one or more points P$_2$ in view 502 (or vice versa). This can be done using computer-vision algorithms which may determine that observations at one or more points P$_1$ are observations of the same feature(s) as observations at one or more points P$_2$. The mapped combination can mitigate the differences in perspective due to the different focal points 508, 510. In some embodiments, the combined AR/MR recording can display virtual content in approximately the same way as the virtual content is displayed to a user of an AR/MR system. However, as described above, in some embodiments, useful information captured by a RGB camera may be discarded to avoid an artificial border between real content and virtual content.

FIG. 6 illustrates an example embodiment for producing an AR/MR recording. The example embodiment shown can be implemented using one or more components of a mixed reality system, such as one or more of wearable head device 2102, handheld controller 300, and auxiliary unit 320 of the example mixed reality system 200 described above. An AR/MR system (e.g., MR system 112, 200) can render virtual content from one or more perspectives (e.g., virtual content can be rendered once from a perspective of a user's left eye, and once from a perspective of a user's right eye). An AR/MR system can also render virtual content a third time from a perspective of a RGB camera that can be located near a user's eye (e.g., the user's left eye) and facing approximately in the same direction as the user's forward gaze. In some embodiments, this third-pass rendering of virtual content can be rendered to the same resolution, aspect ratio, and/or field of view of a RGB camera. This can allow an AR/MR recording to be generated with synchronized virtual content and real content without discarding any information from either the RGB camera or the virtual rendering. However, in some embodiments, a third-pass rendering of virtual content can be computationally expensive. A third-pass rendering can include a full geometry pass, which can include a full draw call and/or rasterization. Additional details can be found in U.S. patent application Ser. No. 15/924,144, the contents of which are hereby incorporated by reference in their entirety. It may not be feasible to perform a third-pass rendering on a portable AR/MR system with limited computing resources (e.g., because the AR/MR system is already rendering twice for the user's two eyes). It can further consume additional power as a result of the higher computational load, which can negatively impact battery life for AR/MR systems relying on portable power.

Figure 7:
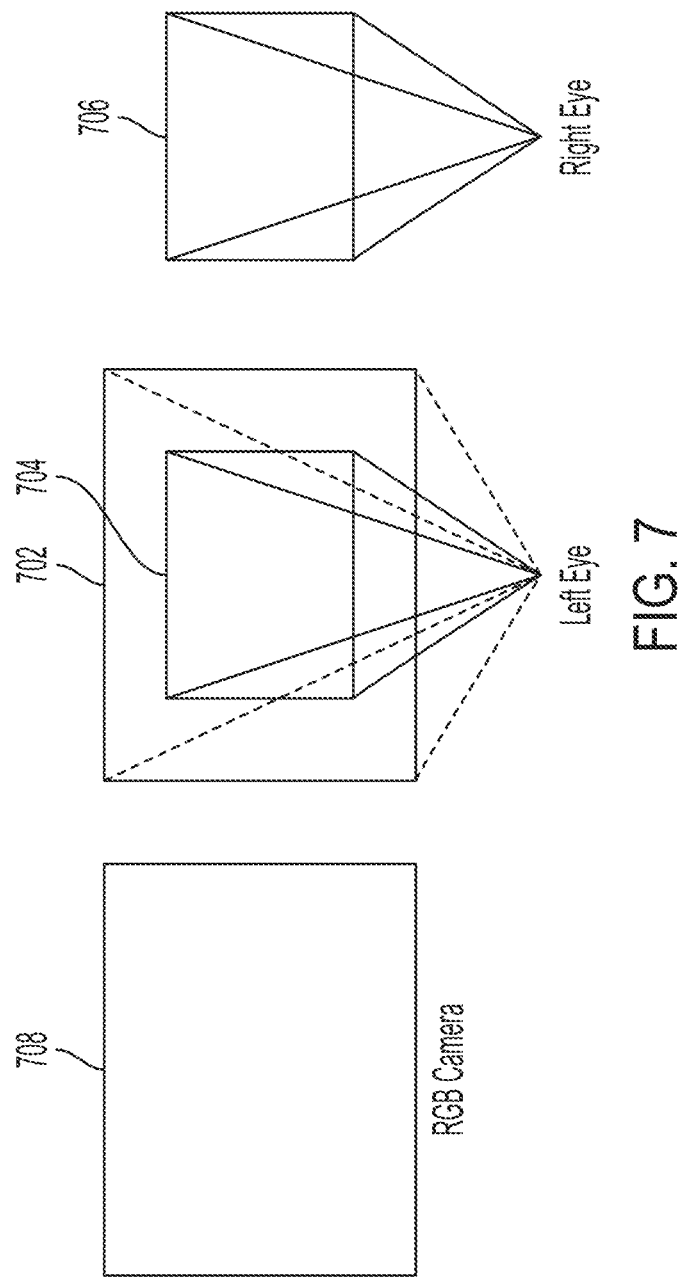
FIG. 7 illustrates an example of mixed reality recording, according to one or more embodiments of the disclosure.

FIG. 7 illustrates an example embodiment for producing an AR/MR recording. The example embodiment shown can be implemented using one or more components of a mixed reality system, such as one or more of wearable head device 2102, handheld controller 300, and auxiliary unit 320 of the example mixed reality system 200 described above. An AR/MR system (e.g., MR system 112, 200) can render virtual content from one or more perspectives (e.g., virtual content can be rendered once from a perspective of a user's left eye and once from a perspective of a user's right eye). In some embodiments, two virtual renderings (e.g., one for each eye) may be non-uniform. For example, a virtual rendering for a user's left eye may render to a view 702, which may be different than a virtual rendering for a user's right eye, which may render to a view 706. View 706 may be approximately the same size as a field of view for the user's right eye (e.g., so no virtual content is rendered that won't be displayed to a user, thereby minimizing a computational load). View 702 may be larger than view 706, and may render to a larger field of view than is visible to the user's left eye. View 702 can include view 704, which can be a field of view available to the user's left eye (e.g., all virtual content displayed to the user can be included in view 702, in addition to some virtual content that may not be displayed to the user). View 702 can optionally have the same or approximately the same field of view as view 708, which can be a field of view available to a RGB camera (e.g., a RGB camera situated near a user's left eye and facing in the same direction as the user's forward gaze).

During an AR/MR recording, views 702 and 706 can be rendered (e.g., by a MR system 112, 200). View 702 may be cropped to view 704, which can have the same field of view as view 706, but view 704 may be rendered from a slightly different perspective (e.g., from the perspective of a left eye instead of from the perspective of a right eye). Views 704 and 706 can display virtual content to a user, and views 704 and 706 can create stereoscopic imagery to simulate three-dimensional virtual content. A RGB camera can simultaneously record video of the real environment from a similar perspective as a user's perspective (e.g., the RGB camera may be situated near one of the user's eyes). This real environment recording stream can then be combined with view 702 (which can be a virtual environment recording stream) to create a MR recording. In some embodiments, virtual environment recording stream from view 702 may be approximately the same resolution, aspect ratio, and/or field of view as view 708. Accordingly, an AR/MR recording combining the real environment recording stream with the virtual environment recording stream may discard little to no information captured by the RGB camera and/or the virtual rendering. It can further be beneficial to render non-uniform stereoscopic virtual content because it can be more computationally efficient to expand one of two rendering passes than to use a full third-pass rendering. Expanding an existing rendering pass may only include additional rasterization for additional pixels, but may not include a full geometry pass (unlike a third-pass rendering in some embodiments).

Figure 8:
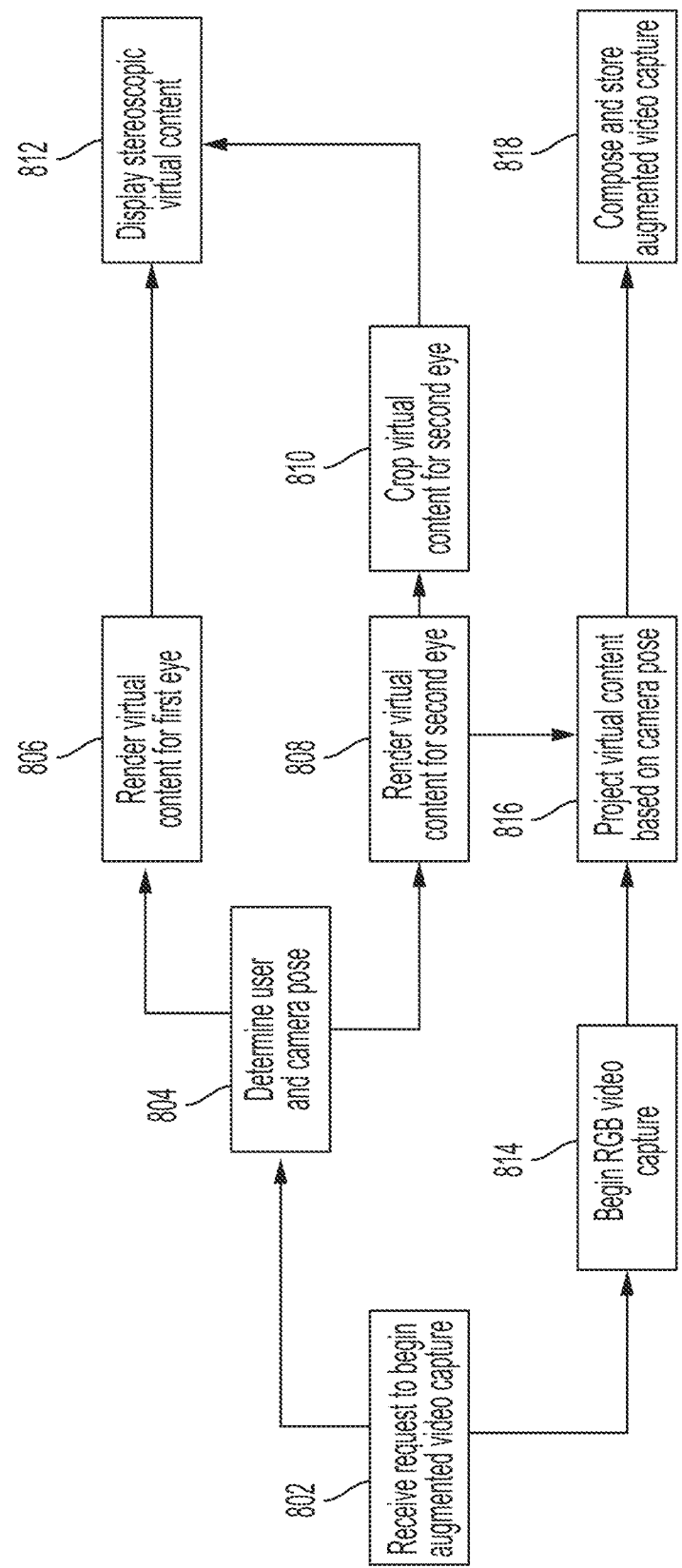
FIG. 8 illustrates an example of mixed reality recording, according to one or more embodiments of the disclosure.

FIG. 8 illustrates an example process for generating an AR/MR recording, which can be an augmented video capture. The example process shown can be implemented using one or more components of a mixed reality system, such as one or more of wearable head device 2102, handheld controller 300, and auxiliary unit 320 of the example mixed reality system 200 described above. At step 802, a request can be received to begin augmented video capture. A request can be user-initiated (e.g., the user selects a setting to begin recording, or the user speaks aloud to begin recording, which an AR/MR system can process as a user request, or the user performs a gesture, which an AR/MR system can process as a user request), or automated (e.g., computer-vision algorithms detect a scene that machine-learning algorithms have determined to be likely of interest to a user, and a MR system accordingly automatically begins recording). At step 804, a user's pose and a RGB camera's pose can be determined/estimated. A user's pose can include information regarding a user's position and/or orientation in a three-dimensional environment. A user's pose may be the same or similar to a pose of an AR/MR system (e.g., if an AR/MR system is a wearable head device that is fixed relative to a user's head). Pose can be estimated using methods like SLAM, visual-inertial odometry, and/or other appropriate methods. A RGB camera's pose may be determined/estimated independently and/or derived from a pose of an AR/MR system (which can approximate a pose of a user). For example, a RGB camera can be mounted on the AR/MR system in a fixed location that can be known to the AR/MR system. The AR/MR system can utilize its own estimated pose in combination with a RGB camera's location relative to the AR/MR system to determine/estimate a pose of the RGB camera. At step 806, virtual content can be rendered for a user's first eye (e.g., the user's right eye) based on a pose estimate for the user and/or the AR/MR system. Virtual content can be rendered by simulating a first virtual camera that can be positioned at a center of the user's eye (e.g., the user's first eye).

At step 808, virtual content can be rendered for a user's second eye (e.g., the user's left eye) based on a pose estimate for the user and/or the AR/MR system and the RGB camera. Virtual content rendered for a user's second eye can simulate a second virtual camera that can be positioned at a center of the user's eye (e.g., the user's second and/or left eye). Virtual content rendered for the user's second eye can include other changes in addition to a change in perspective and/or virtual camera location when compared to virtual content rendered for the user's first eye. In some embodiments, a framebuffer size (e.g., an image plane size) of a second virtual camera (e.g., the virtual camera to be composited with the RGB camera, which can also be a virtual camera for the user's left eye) can be increased when compared to a framebuffer size of a virtual camera for the user's first eye (e.g., the first virtual camera). The aspect ratio of the framebuffer for the second eye can match an aspect ratio of a framebuffer for the first eye (although other aspect ratios may be used). In some embodiments, a projection matrix of the virtual camera for the second eye can be changed such that a larger field of view is rendered when compared to a virtual camera for the first eye. It can be desirable to change a projection matrix of the virtual camera to account for a larger framebuffer size. Failing to increase a field of view and/or change a projection matrix of the virtual camera to account for a larger framebuffer size can result in virtual content not matching virtual content presented to a different eye such that the stereoscopic effect may be reduced and/or lost. In some embodiments, an increased field of view and/or a changed projection matrix can produce a virtual rendering with a same field of view as a RGB camera located near the user's second eye. In some embodiments, a view matrix can remain unchanged for the virtual camera to be composited with the RGB camera (e.g., the virtual camera can still render from the same position with the same vector to target). In some embodiments, a minimum clipping distance (e.g., a minimum distance from a user's eyes to virtual content, below which virtual content may not be rendered) can prevent virtual objects from being rendered in a region that may be outside a field of view of a RGB camera, but inside a field of view of a virtual camera positioned at a center of a user's second eye.

At step 810, virtual content rendered for the second eye at step 808 can be cropped for display to the user's second eye. In some embodiments, a center of the expanded field of view can also be a center of a cropped field of view presented to the user's second eye. The cropped field of view can be the same size as a field of view for virtual content rendered for the user's first eye. Virtual content rendered for the user's first eye and the cropped virtual content rendered for the user's second eye can combine to produce a stereoscopic effect for virtual content displayed to a user, which can simulate three-dimensionality of virtual content. At step 812, the virtual content can be displayed to a user. In some embodiments, steps 806, 808, and/or 810 can happen at the same time or substantially the same time. For example, an AR/MR system may render virtual content for a user's first eye and a user's second eye, crop virtual content rendered for a user's second eye, and display stereoscopic virtual content to a user with little to no perceptible delay (e.g., stereoscopic virtual content may track real content as a user looks around a real environment).

At step 814, RGB video capture can begin (e.g., using a RGB camera mounted on an AR/MR system). At step 816, an expanded (e.g., uncropped) virtual content field of view can be composited with the captured RGB video. For example, the expanded virtual content field of view can be projected (e.g., using planar projection) onto the captured RGB video. In some embodiments, the captured RGB video can be projected (e.g., using planar projection) onto the virtual content field of view. In some embodiments, the virtual content field of view can be the same size as the RGB camera's field of view. This can result in very little loss of RGB camera information and/or virtual information. In some embodiments, some information may be lost as a result of the projection process. In some embodiments, the virtual content field of view may be larger than the RGB camera's field of view so losses due to projection may not require discarding information captured by the RGB camera. In some embodiments, the virtual content field of view may be smaller than the RGB camera's field of view, so losses due to projection may require discarding information captured by the RGB camera. At step 818, the augmented video capture can be composed and stored. In some embodiments, the augmented video capture can display more information than was presented to a user of the recording AR/MR system. For example, an AR/MR recording can have an expanded field of view when compared to a user's field of view while using an AR/MR system.

Figure 9:
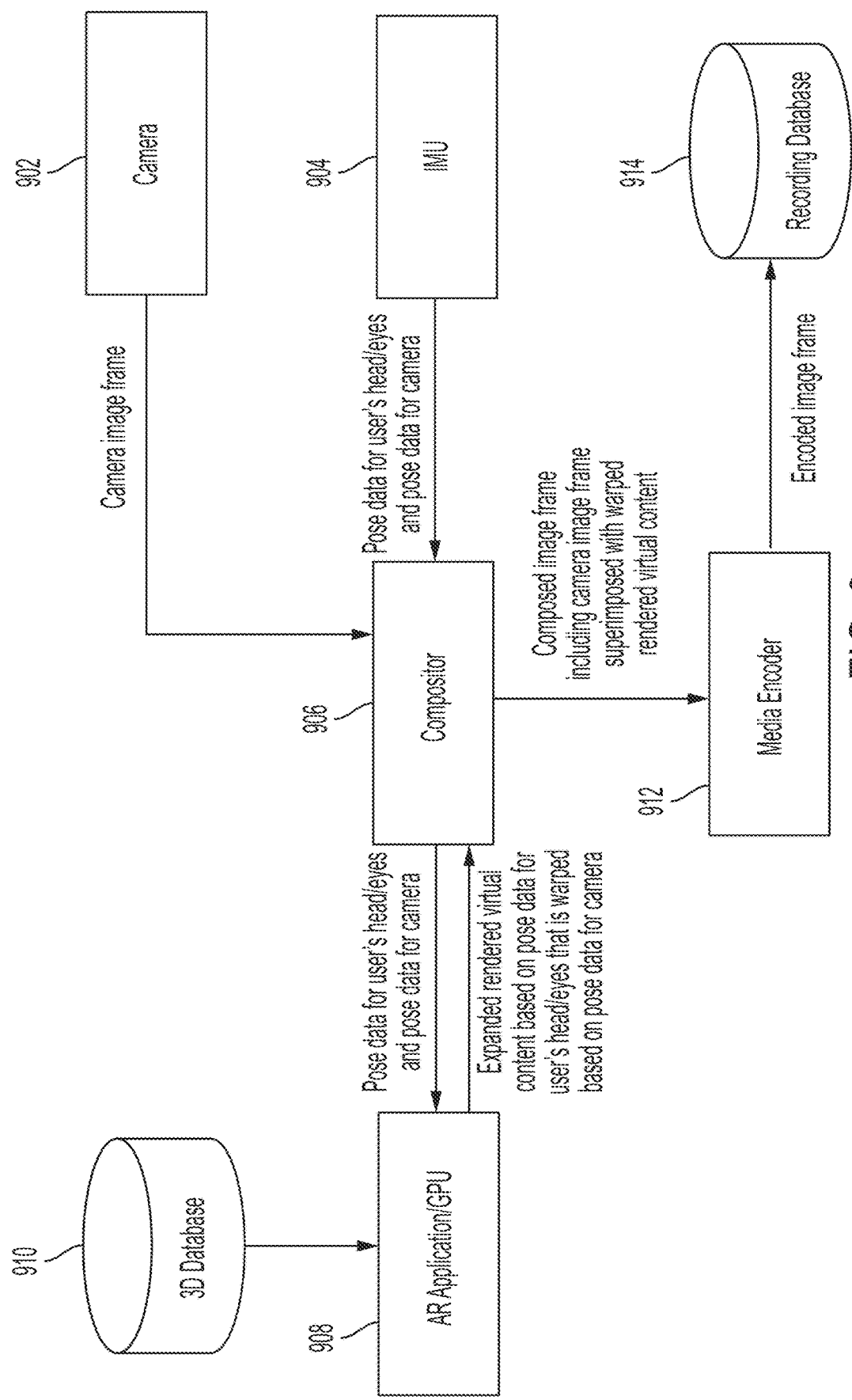
FIG. 9 illustrates an example of mixed reality recording, according to one or more embodiments of the disclosure.

FIG. 9 illustrates an example system for composing and storing augmented video capture, which can correspond to steps 816 and 818. The example system shown can be implemented using one or more components of a mixed reality system, such as one or more of wearable head device 2102, handheld controller 300, and auxiliary unit 320 of the example mixed reality system 200 described above. Camera image frames from camera 902 can be sent to a compositor 906, along with pose data for a user's head/eyes and/or pose data for a camera from an IMU 904. Pose data can then be sent from compositor 906 to an AR/MR application and/or a graphics processing unit ("GPU") 908, which can pull information (e.g., models) from a 3D database. The AR/MR application 908 can send an expanded virtual rendering to compositor 906. Compositor 906 can then compose the expanded virtual rendering with the camera image frame from camera 902 (e.g., using planar projection) and send the composed frame to media encoder 912. Media encoder 912 can then send the encoded image frame to recording database 914 for storage.

Although embodiments with one RGB camera have been described above, it is also contemplated that systems and methods described herein can apply to any number of RGB cameras. For example, two RGB cameras may be used, with one RGB camera mounted near each of a user's eyes. The virtual renderings for each eye may then both be expanded (although only a limited field of view may be presented to the user during use) and projected onto a field of view of the RGB camera (the RGB camera image may also be projected into the virtual image). This can allow for stereoscopic augmented video capture, and may be particularly suitable for playback on another MR system, which can provide a more immersive experience than playback on a 2D screen. It is also contemplated that systems and methods may be used to shift an RGB camera's perspective to be as close to a user's eye's perspective as possible. For example, mirrors and/or other optical elements may be used to reflect light such that an RGB camera views content from the same (or approximately the same) perspective as a user's eye. Augmented video capture can also include composited audio in addition to composited video. For example, virtual audio signals can be recorded and composited with recorded real audio signals (which may be captured by one or more microphones on a MR system). Composited audio may further be synchronized with composited video.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A method comprising:
   receiving, via one or more sensors of a wearable head device, an image of a real environment;
   estimating a pose of the wearable head device, wherein the pose is estimated via performing, based on an output of the one or more sensors, one or more of Simultaneous Localization and Mapping (SLAM) and visual-inertial odometry;
   generating a first image of a virtual environment based on the pose;
   generating a second image of the virtual environment based on the pose, wherein the second image of the virtual environment comprises a larger field of view than a field of view of the first image of the virtual environment; and
   generating a combined image based on the second image of the virtual environment and the image of the real environment, wherein:
   generating the combined image comprises performing a planar projection, the planar projection comprising a mapping of a point of the second image of the virtual environment to a corresponding point of the image of the real environment.

2. The method of claim 1, further comprising:
   generating a cropped image based on the second image of the virtual environment; and
   presenting, via a display of the wearable head device, a stereoscopic image based on the first image of the virtual environment and the cropped image.

3. The method of claim 2, wherein the cropped image comprises a center of the cropped image, wherein the second image of the virtual environment comprises a center of the second image, and wherein the center of the cropped image is the same as the center of the second image.

4. The method of claim 2, wherein the cropped image comprises a cropped field of view, and wherein the field of view of the second image of the virtual environment is larger than the cropped field of view.

5. The method of claim 1, wherein the second image of the virtual environment comprises an aspect ratio, and wherein the image of the real environment comprises the same aspect ratio.

6. The method of claim 1, wherein the second image of the virtual environment comprises an aspect ratio, and wherein the first image of the virtual environment comprises the same aspect ratio.

7. The method of claim 1, wherein the first image of the virtual environment comprises a first framebuffer size, wherein the second image of the virtual environment comprises a second framebuffer size, and wherein the second framebuffer size is larger than the first framebuffer size.

8. The method of claim 1, wherein the first image of the virtual environment comprises a framebuffer size, and wherein the cropped image comprises the same framebuffer size.

9. The method of claim 1, wherein the first image of the virtual environment comprises a first resolution, wherein the second image of the virtual environment comprises a second resolution, and wherein the second resolution is larger than the first resolution.

10. The method of claim 1, wherein the one or more sensors comprises a camera, and the camera is configured to be placed to a left side of a user's left eye.

11. The method of claim 1, wherein the one or more sensors comprises a camera, and the camera is configured to be placed to a right side of a user's right eye.

12. The method of claim 1, wherein the one or more sensors comprises a camera, and the camera is configured to be placed in between a user's left eye and a user's right eye.

13. The method of claim 1, further comprising presenting, via a display, the combined image to a second device, different from the wearable head device.

14. The method of claim 1, wherein a focal point of the image of the real environment, the point of the second image of the virtual environment, and the corresponding point of the image of the real environment are collinear.

15. A system comprising:
    one or more sensors of a wearable head device;
    one or more processors configured to execute a method comprising:
      receiving, via the one or more sensors of the wearable head device, an image of a real environment;
      estimating a pose of the wearable head device, wherein the pose is estimated via performing, based on an output of the one or more sensors, one or more of Simultaneous Localization and Mapping (SLAM) and visual-inertial odometry;
      generating a first image of a virtual environment based on the pose;
      generating a second image of the virtual environment based on the pose, wherein the second image of the virtual environment comprises a larger field of view than a field of view of the first image of the virtual environment; and
      generating a combined image based on the second image of the virtual environment and the image of the real environment, wherein:
      generating the combined image comprises performing a planar projection, the planar projection comprising a mapping of a point of the second image of the virtual environment to a corresponding point of the image of the real environment.

16. The system of claim 15, further comprising:
    generating a cropped image based on the second image of the virtual environment; and
    presenting, via a display of the wearable head device, a stereoscopic image based on the first image of the virtual environment and the cropped image.

17. The system of claim 16, wherein the cropped image comprises a center of the cropped image, wherein the second image of the virtual environment comprises a center of the second image, and wherein the center of the cropped image is the same as the center of the second image.

18. A non-transitory computer-readable medium storing instructions that, when executed by one or more processors, cause the one or more processors to execute a method comprising:
- receiving, via one or more sensors of a wearable head device, an image of a real environment;
- estimating a pose of the wearable head device, wherein the pose is estimated via performing, based on an output of the one or more sensors, one or more of Simultaneous Localization and Mapping (SLAM) and visual-inertial odometry;
- generating a first image of a virtual environment based on the pose;
- generating a second image of the virtual environment based on the pose, wherein the second image of the virtual environment comprises a larger field of view than a field of view of the first image of the virtual environment; and
- generating a combined image based on the second image of the virtual environment and the image of the real environment, wherein:
  - generating the combined image comprises performing a planar projection, the planar projection comprising a mapping of a point of the second image of the virtual environment to a corresponding point of the image of the real environment.

19. The non-transitory computer-readable medium of claim 18, further comprising:
- generating a cropped image based on the second image of the virtual environment; and
- presenting, via a display of the wearable head device, a stereoscopic image based on the first image of the virtual environment and the cropped image.

20. The non-transitory computer-readable medium of claim 19, wherein the cropped image comprises a center of the cropped image, wherein the second image of the virtual environment comprises a center of the second image, and wherein the center of the cropped image is the same as the center of the second image.

* * * * *